United States Patent [19]

Bonomi et al.

[11] Patent Number: 5,084,951
[45] Date of Patent: Feb. 4, 1992

[54] MULTI-AXIS TOOL POSITIONER

[75] Inventors: Giovanni B. Bonomi; Battistino Oldani, both of Rockford, Ill.

[73] Assignee: IMTA, Rockford, Ill.

[21] Appl. No.: 621,076

[22] Filed: Nov. 30, 1990

[51] Int. Cl.⁵ .................. B23B 39/20; B23C 1/12
[52] U.S. Cl. ...................... 29/26 A; 29/39; 409/201; 409/211
[58] Field of Search ........... 29/33 K, 568, 27 C, 29/26 A, 50, 39, 40; 409/201, 230, 211, 202, 235

[56] References Cited

U.S. PATENT DOCUMENTS

| 2,750,851 | 6/1956 | Berthiez | 409/211 |
| 3,823,645 | 7/1974 | Sukhov et al. | 409/201 X |
| 3,958,491 | 5/1976 | Habib | 409/230 X |
| 4,543,020 | 9/1985 | Shtipelman | 29/26 R |
| 4,955,119 | 9/1990 | Bonomi et al. | 29/50 |

FOREIGN PATENT DOCUMENTS

| 610618 | 6/1978 | U.S.S.R. | 409/201 |
| 694697 | 7/1953 | United Kingdom | 409/211 |

Primary Examiner—William Briggs
Attorney, Agent, or Firm—McCaleb, Lucas & Brugman

[57] ABSTRACT

A multi-axis, remote control, mobile, robotic machining center of Cartesian structure having three mutually perpendicular X, Y and Z linear movement axes in which an elongated horizontal ram, adapted to carry various working tools at one outer end thereof, is rigidly supported on a vertical pedestal for movement along the vertical Y axis and linear Z-axis. The ram also is mounted for rotational movement about a horizontal A axis normal to the Y axis and is thereby capable of being selectively positioned in either of two horizontal operating attitudes in which the working tools are operably disposed on opposite sides of the pedestal.

14 Claims, 7 Drawing Sheets

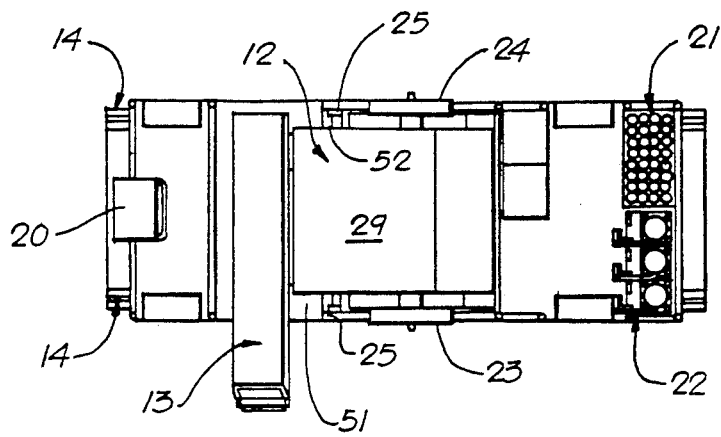
FIG. 4
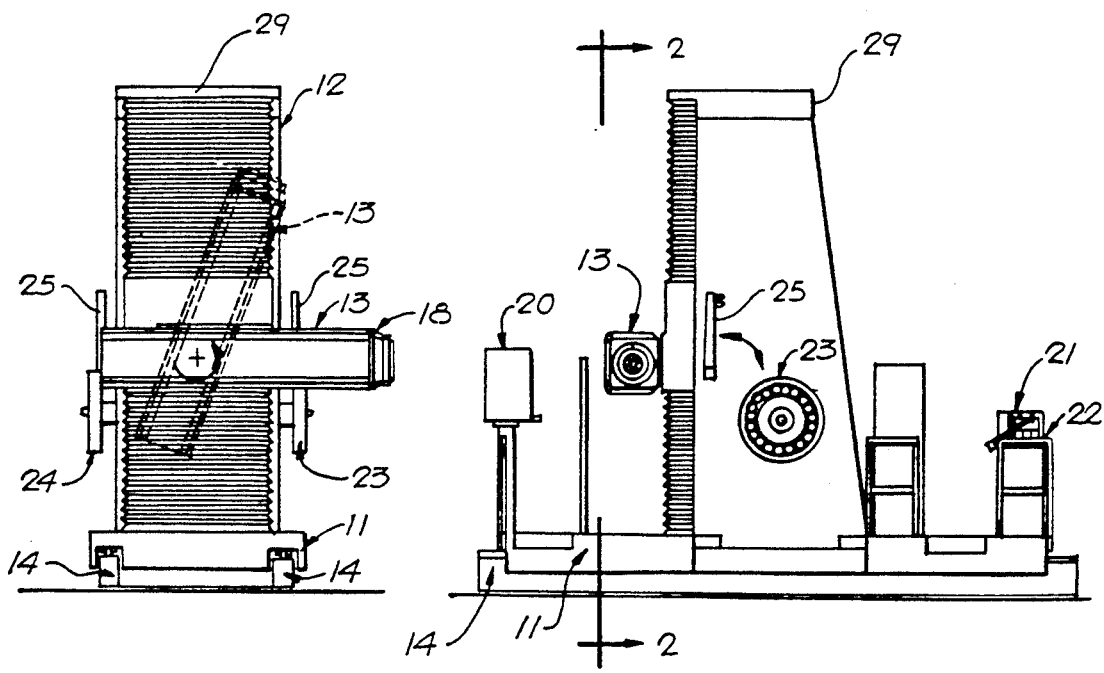
FIG. 2
FIG. 3

MULTI-AXIS TOOL POSITIONER

This invention is directed generally to mobile, remotely controlled automatic machine tool actuators and positioning devices or industrial "robots" and more specifically to improvements for expanding the working capability and versatility thereof.

BACKGROUND

Under modern day industrial technology and practice, computer controlled, high-speed, mobile machine centers or "robots" capable of driving and positioning a variety of machine tools in selected spacial positions have gained popular acceptance for a wide variety of industrial applications. Such robots are capable in many instances of substantially unmanned automatic operation, including the ability to automatically change tooling whereby to carry out a host of pre-programmed machining operations such as drilling, milling, cutting, grinding, impacting, routing, measuring, fastener installation, inspecting, locating and other related tasks.

Robotic machines of this order must be highly accurate in positioning and operating the selected tooling and as a consequence they are generally heavy, relatively cumbersome, rigid and costly structures which, however, are uniquely tireless and thus capable of substantially uninterrupted, dependable, highly accurate, economical and cost effective production of consistently high quality products.

One such industrial application familiar to the inventor hereof, is described in U.S. Pat. No. 4,885,836, issued Dec. 12, 1989, to the assignee of this application. As therein described, a pair of synchronized, computer controlled, robotic machining centers capable of automatically working and operating in mirror relationship on opposite sides of fixture held components to be assembled are utilized in a work cell environment for the production of aircraft sections, for example. By providing suitable tooling to the two robotic machine centers, the components of the assembly are structurally unified by the use of rivets and similar fasteners, with the robots carrying out the basic hole preparation, rivet installation and riveting cycles under the supervision of computers which work the robots in accordance with memory banked design data for the complete assembly.

In general the robotic machine centers or robots described in said patent are mounted in parallel aisles to run along elongated horizontal tracks or bedways in response to actuation of suitable power drives; each robot being of Cartesian structure with mutually perpendicular X, Y and Z axes, the X axis being defined by the machine's associated horizontal linear bedways; the Y axis being defined by a central vertical column which carries a horizontal, linearally moveable power ram defining the Z axis of movement. An articulated wrist or twist head is mounted at one end of the ram and comprises a pair of transverse rotary movement axes. The vertical column preferably is rotatable about its vertical axis for defining a third rotary axis. The twist head of each of the robots is designed to accept selected end effectors carrying specific tooling for accomplishing required tasks with such tooling being capable of linear extension and retraction movements in accordance with corresponding linear movements of a rotatably driven quill.

In a later U.S. Pat. No. 4,955,119 issued Sept. 11, 1990 and assigned to the assignee hereof, provision of a novel multi-task end effector attachment for the articulated twist head of a computer controlled robotic machining center of the order set out in the aforesaid U.S. Pat. No. 4,885,836 is disclosed. According to the invention of this later patent a single robotic machining center is capable of performing the functions of hole preparation, rivet or fastener insertion and installation by virtue of a single end effector having master and slave tool heads in opposing coaxial relationship which are capable of operating on opposite sides of fixture held work pieces to carry out requisite functions. With the improvement of U.S. Pat. No. 4,955,119, a single robot has the capability of servicing multiple fixture held work part assemblies by rotatably swinging the robot's horizontal ram about the upright pedestal's vertical axis so that the robot can alternately service parts to be assembled in adjacent work cell aisles.

Despite the obvious economic advantages of dedicating a single robot to multiple assemblies as briefly outlined above, swinging the ram horizontally about the vertical axis of the robot's pedestal is not only time consuming, but requires sufficient space in which to carry out the operation. Such space is not always readily available in the confines of the work cell and the fixture held work pieces, however. Thus there is a need for a more versatile robotic machining center capable of selectively positioning a robot's ram to permit operation of tooling carried thereby in adjacent aisles of a work cell. It is to such an improvement that the present invention is directed.

BRIEF SUMMARY OF THE INVENTION

This invention is directed to a multi-axis, remotely controlled, robotic machining center of Cartesian structure having mutually perpendicular X, Y and Z linear movement axes, namely a horizontal X axis, a vertical Y axis and a horizontal Z axis with the machining center being moveable along horizontal rails or guideways definitive of the X axis and comprising a vertical pedestal definitive of the Y axis and carrying a horizontally disposed linearally moveable ram defining the Z axis. The ram is equipped to carry working tools or end effectors on an articulated wrist or twist head attached to one end thereof and definitive of perpendicular rotary movement axes as well as a linear movement axis coincident with the Z axis, but independent thereof, as defined by an axially moveable rotatable tool driving quill. The ram is supported on the vertical pedestal for movement along the linear Y axis thereof and also is rotatably supported on that pedestal for rotational movement in a vertical plane by means of a mounting system which includes positive stop members capable of accurately positioning the ram in two horizontal operating positions and a brake system for positively holding the ram in such positions so that tooling carried by the ram is capable of being moved to and operatively positioned at either of two diametrically opposite working positions.

A principle object of this invention is to provide an improved robotic machining center of Cartesian structure in which an operationally horizontal, linearally moveable ram is adapted to rotate in a vertical plane about a horizontal axis between two diametrically opposed horizontal operating positions.

Another important object of this invention is to provide an improved robotic machining center of the order set forth in the preceding object in which the ram is selectively held in either of its two operating positions by positive acting brake means.

A still further object of this invention is to provide an improved robotic machining center of Cartesian structure having a linearly moveable ram aligned normal to a horizontal movement axis of the robot; the ram being equipped to carry tooling at one outer end thereof and being rotatably moveable through a prescribed vertical arc whereby to reversely position its tool carrying head on opposite sides of the robot's vertical Y axis.

Still another important object of this invention is to provide an improved rotatable support for a horizontal ram in an industrial robot whereby the ram is rotatably moveable in a vertical plane through and along a prescribed arc of movement.

Having described this invention, the above and further objects and features of the invention will be recognized by those skilled in the art from the following detailed description of a preferred embodiment thereof illustrated in the accompanying drawings and representing the best mode presently contemplated for enabling those of skill in the art to practice this invention.

In the Drawings

FIG. 2 is a side elevation of the machining center illustrated in FIG. 1, at a reduced scale thereover, and taken substantially from vantage line 2—2 of FIG. 3;

FIG. 3 is a front elevation of the machining center, shown in FIG. 1, but at the reduced scale of FIG. 2;

FIG. 4 is a top plan view of the machining center shown in FIGS. 2 and 3;

DESCRIPTION OF THE PREFERRED EMBODIMENT

Figure 1:
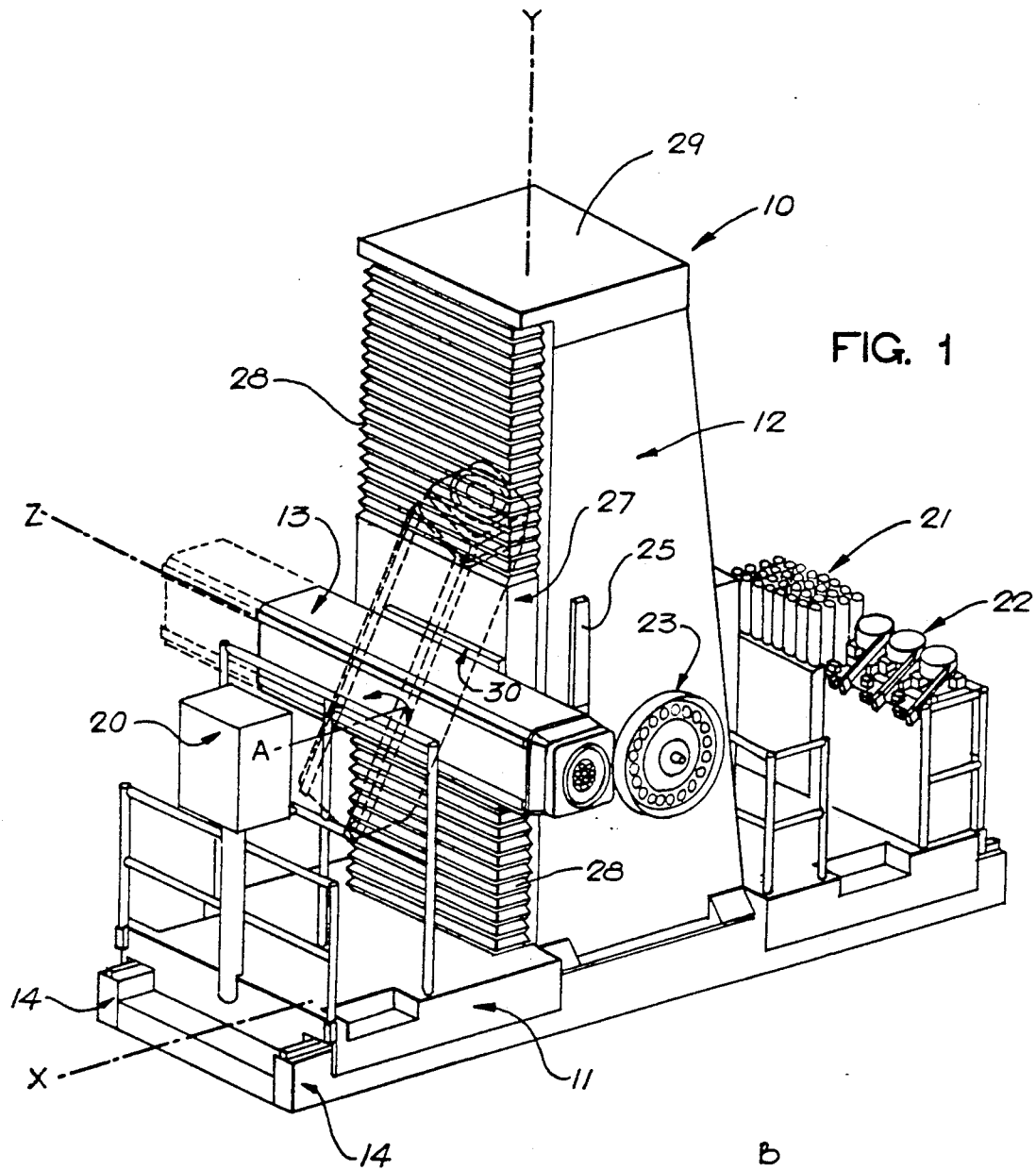
FIG. 1 is a perspective view looking at the top, front and left side of a robotic machining center in accordance with this invention.
Figure 1A:
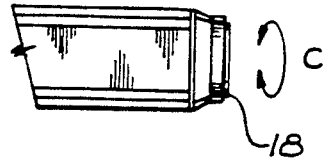
FIG. 1A is a partial side elevation of the working end of the machining center ram shown in FIG. 1.

With initial reference to FIGS. 1-4 of the drawings, it will be recognized from FIG. 1 that an automatic, remotely controlled, mobile robotic machining center, generally indicated 10, comprises a horizontal base 11 supporting a vertically extending column 12 which in turns supports a horizontal ram 13 along one side thereof. Such a robotic machining center is adapted to run along a pair of horizontally extending parallel rails 14, 14 or bedways definitive of the X axis of the Cartesian structured robot. Base 11 is undersupported on the rails or bedways 14 and driven linearally therealong, as selected, by appropriate power drive means, such as a rack and pinion drive (not shown). The vertical Y axis of the robot is defined by the column 12 and the Z axis is defined by the operationally horizontal ram 13, which also is power actuated along the axis Z to extend or retract, relative to the vertical column 12 as desired.

Figure 1B:
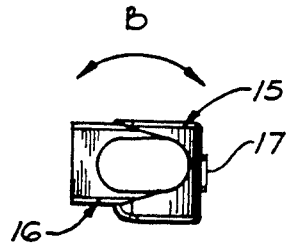
FIG. 1B is a side elevation of a bi-rotational twist head attachment for the working end of the ram illustrated in FIG. 1A.

In accordance with this invention the ram 13 is mounted to rotatably move relative to column 12 about a central A axis which defines a first rotational axis of movement. A second rotational movement axis for the machine is provided by a twist head assembly 15 (see FIG. 1B), which is joined to a main head 16 for the ram and provides movement about a rotational axis B. The twist head normally carries a rotatably driven quill 17 to which appropriate operating tools are attached. The main head 16 in turn is adapted to be coupled to the outer end of the ram 13 and more particularly to a rotatable connector assembly 18 definitive of a third rotational axis C. Thus the robotic machining center 10, as herein illustrated, comprises three linearly moveable Cartesian axes X, Y and Z and at least three rotational axes A, B and C to effectuate desired spacial positioning and movements of tooling attached to twist head 15.

In addition to the foregoing features, the base 11 supports an operator station 20 adjacent ram 13, a rivet buffer station 21 located on the opposite side of the vertical column 12 from ram 13 and alongside a rivet feeder station 22. The vertical column 12 supports a pair of rotatable multi-position tool holders 23 and 24 on the opposite sides thereof (see FIG. 2). These holders cooperate with pivotally moveable tool changers 25 whereby the various tools carried by the holders 23 and 24 on each side of the column 12 may be selectively positioned in the quill 17 of the twist head 15 for selected machining operations.

While it heretofore has been noted that the ram 13 is rotatable about an A axis relative to the vertical column 12, it also is to be noted that the ram is moveable vertically relative to the column along the Y axis defined thereby. To this end a vertically driven Y-axis saddle 27 is moveable vertically along one side of column 12 by an appropriate rack and pinion drive system (not illustrated herein) and a rail guide system. Appropriate bellows 28, 28 connect the saddle 27 with the upper cap end 29 of the column 12 and with the base 11 to enclose the saddle drive and guide system while accommodating vertical movements of the saddle 27 along the Y axis. The ram 13 is in turn supported on a rotatable saddle 30, which is rotatably carried by the vertically moveable saddle 27, as will be described presently.

Y Axis Saddle

Figure 5:
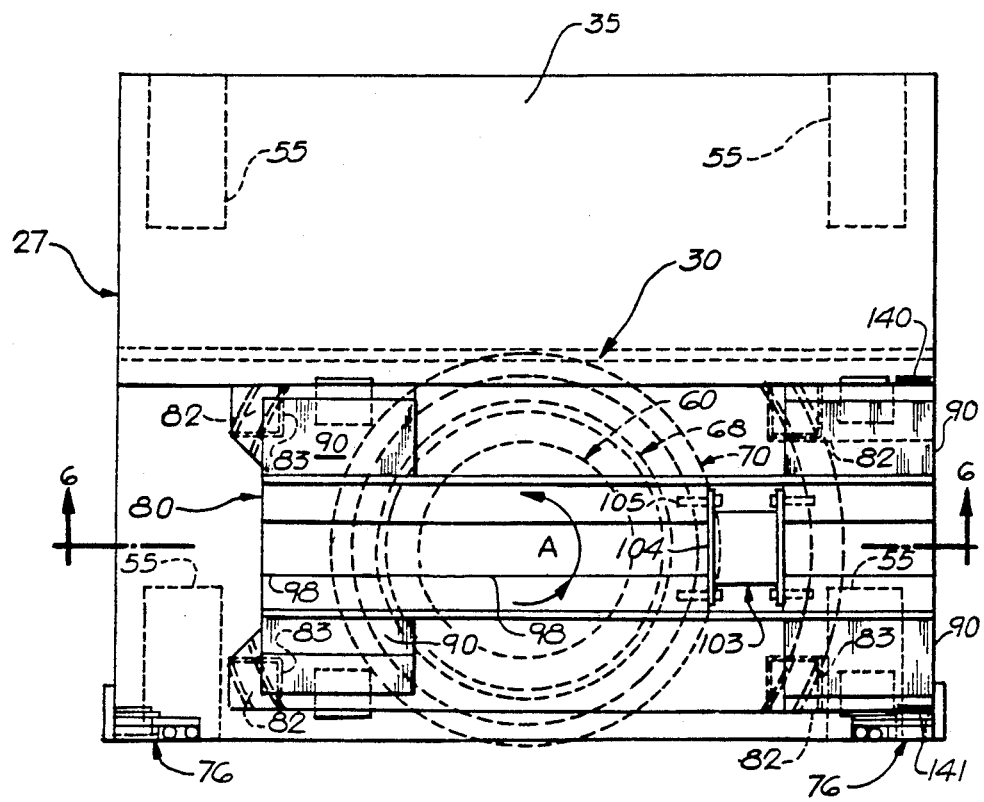
FIG. 5 is a front elevation of a saddle assembly for supporting the ram of the machining center illustrated in FIGS. 2-4, but at an enlarged scale thereover, and with the ram removed.
Figure 6:
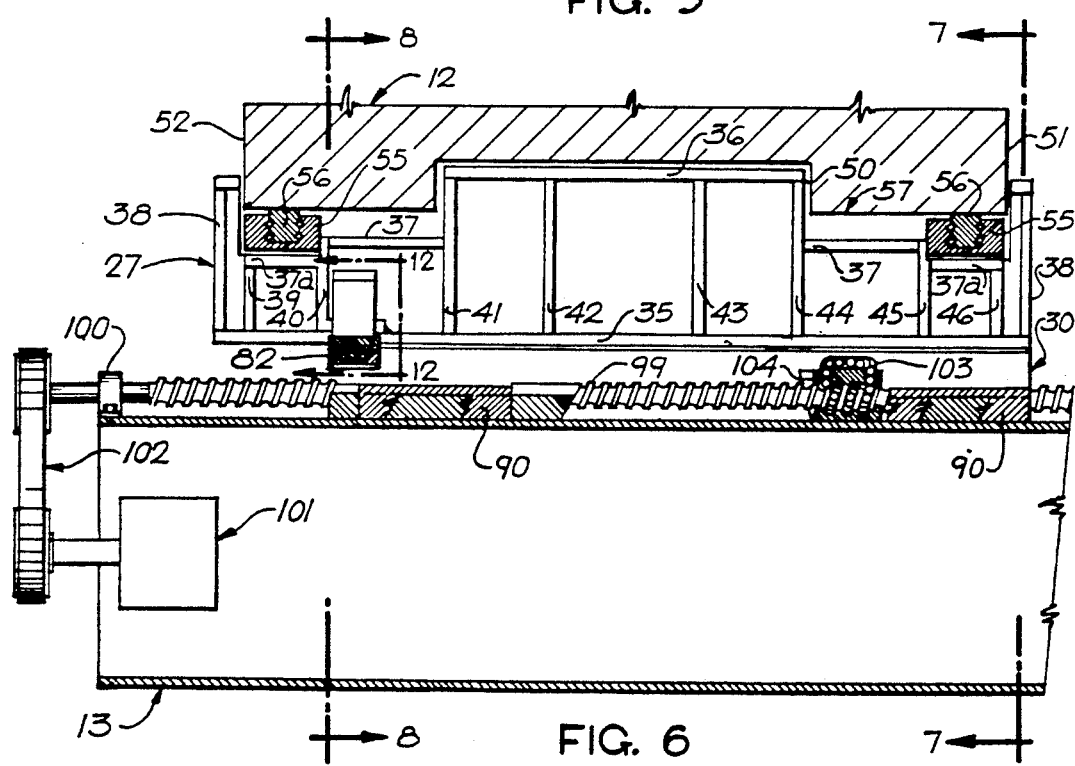
FIG. 6 is a top plan, with portions in section, of the saddle assembly illustrated in FIG. 5 with the ram attached thereto.
Figure 7:
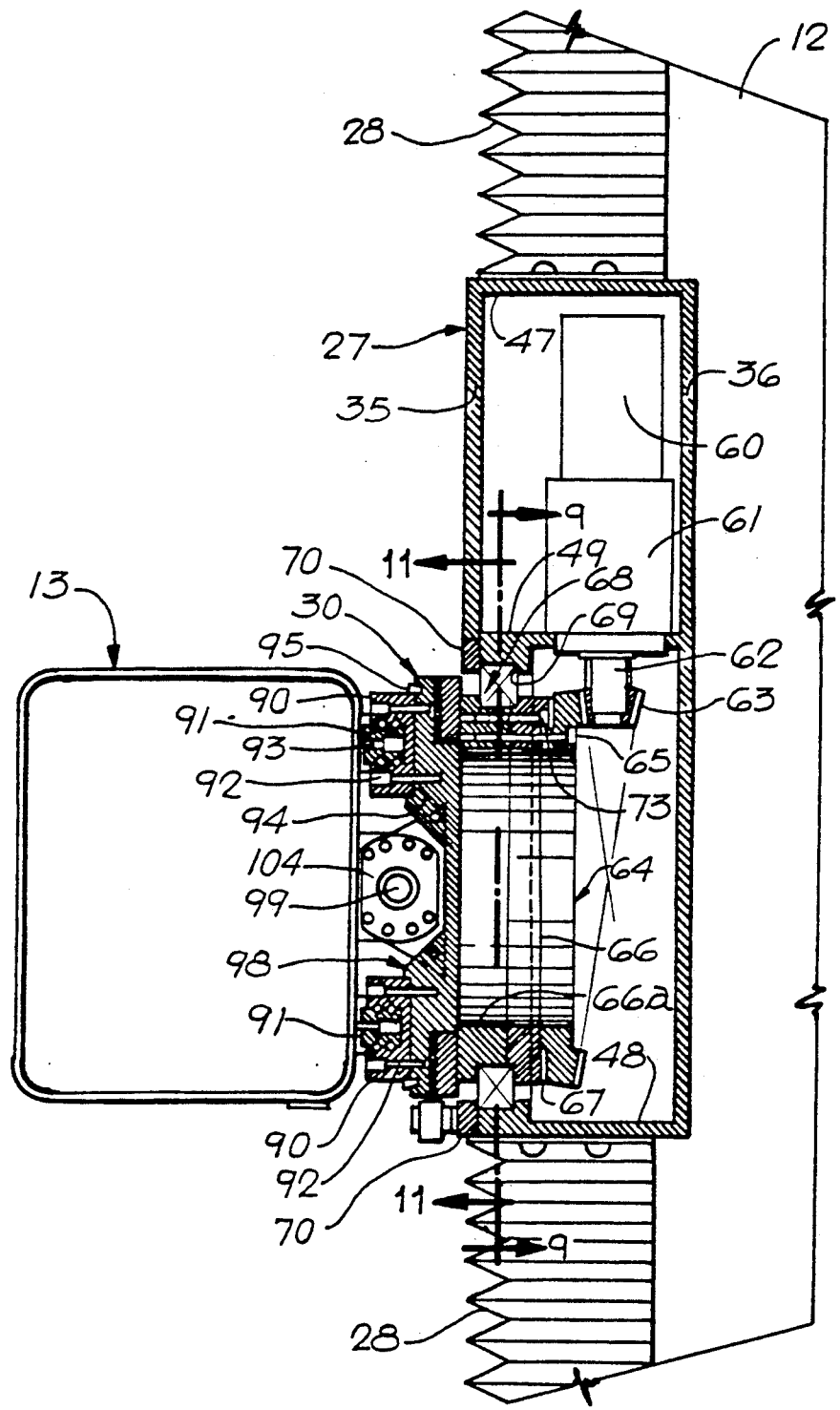
FIG. 7 is a sectional view taken substantially along vantage line 7—7 of FIG. 6 and looking in the direction of the arrows thereon.
Figure 8:
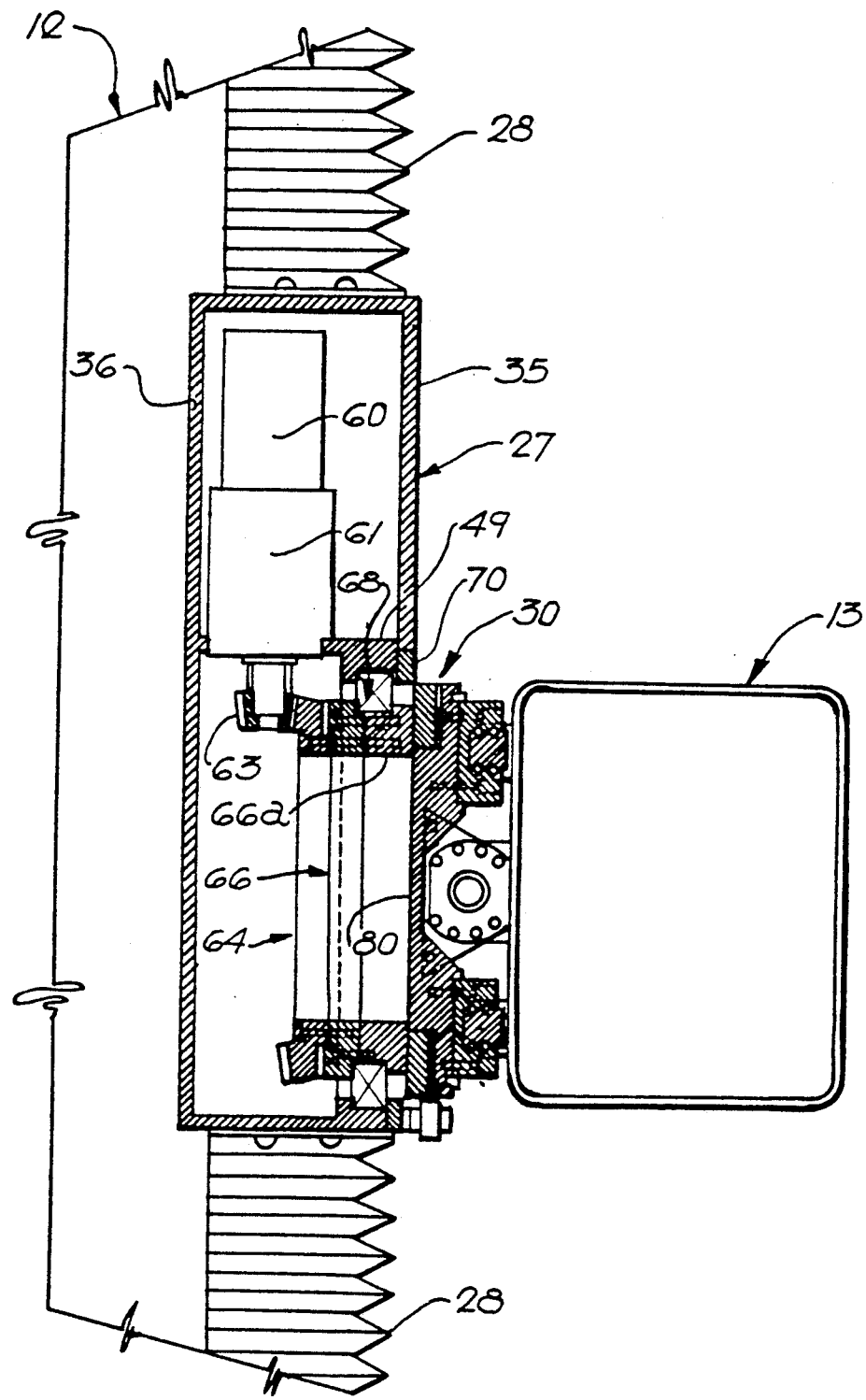
FIG. 8 is a sectional view, similar to FIG. 7, taken substantially along vantage line 8—8 of FIG. 6 and looking in the direction of the arrows thereon.

With specific reference to FIGS. 5-9 of the drawings, it will be recognized that the linearly moveable Y axis saddle 27 comprises a generally rectangular parallelopiped fabricated or cast hollow structure including a front cover wall 35, a central rear wall 36 flanked by co-planar offset portions 37, 37 and co-planar portions 37a, 37a, parallel side walls 38, 38 at opposite or lateral margins or the saddle structure and plural intervening spaced rib walls 39-46 which extend between the front wall 35 and the rear wall 36 and its offset portions, as best illustrated in FIG. 6 of the drawings. In addition to the side walls 38, 38, the front and back walls of the hollow saddle structure are interjoined by top and bottom walls 47 and 48, respectively, and an intermediate transverse support wall 49, as shown in FIGS. 7 and 8 of the drawings. Such hollow saddle structure is adapted to be mounted over one lateral or side face of the central column 12 with the central rear wall 36 thereof located in an elongated, rectangular shaped recess 50 of the column and the side walls 38, 38 thereof extending beyond front and back walls 51 and 52 of the column 12 (see FIG. 6).

As shown in FIGS. 5 and 6, the saddle structure 27 is equipped with four rail pads 55 adjacent the four rear corners of thereof and which are bolted to the secondary offset wall portions 37a (see FIG. 6). These pads are adapted to receive linear guide rails 56 which in turn are affixed to the side wall 57 of column 12 to formulate a pair of parallel spaced, vertically disposed guide means restricting movement of the saddle 27 along the Y axis of the robotic machining center. Actuation of the saddle 27 along the guide rails is effected by means of rack and pinion drive means or suitable equivalents thereof (not shown). Preferably the guide pads and rails utilized for this interconnection of the saddle 27 with column 12 comprise linear motion roller guides in which cylindrical rollers run along opposing track rails 56 to achieve endless linear motion while circulating in a sliding unit. In this instance, the pads 55 constitute such sliding units to provide low friction slidable interconnection for mounting the saddle structure 27. Such linear motion roller guides are available commercially, as for example from Nipon Thompson and Company Ltd., Tokyo, Japan.

From the foregoing it will be understood that in response to selected actuation of the rack and pinion drive or other drive means employed, the Y axis saddle 27 is adapted to be moved vertically and selectively located along the length of the rails 56 whereby to vertically position the saddle 27 and ram 13 attached thereto. Further it will be understood, particularly with reference to FIGS. 1 and 7, that the top and bottom walls 47 and 48 of saddle 27 are coupled to the bellows 28, 28 which protectively enclose the guide rails 56 throughout the range of movements for the Y axis saddle.

Internally the structure of saddle 27 incorporates means for supporting the rotatable saddle 30, as well as means for rotatably driving the ram 13 between its two horizontal operating positions, as previously noted. In order to better understand the supporting and driving means incorporated in saddle 27, specific reference is now made to FIGS. 7, 8 and 9 of the drawings.

As best seen in these figures, a sevo motor 60 and gear reducer 61 are mounted internally of the hollow saddle structure 27; the gear reducer 61 having a drive shaft 62 on which is mounted a driving bevel pinion gear 63. Elements 60-63 are supported on the internal transverse support 49 of saddle 27. The drive system so provided is responsive to computer generated or manual control signals, as appropriate, to rotatably drive the pinion gear 63 in appropriate direction to effectuate desired rotational movement of the ram 13 in operation.

To carry out this latter function bevel pinion 63 engages the teeth of a large bevel ring gear 64 which is connected as by bolts 65 to a split bearing support ring 66 over intervening annular shims 67. Such ring 66 is adapted to receive the inner race of a cross roller bearing assembly 68 while the outer race of such assembly is held in an appropriate annular seat portion 69 cast or fabricated with front wall 35 and support bracket 49. An annular retainer flange 70 is joined to wall 35 by plural bolts 71 so as to border a central circular opening 72 formed through the front wall and lock the outer race of bearing assembly 68 in position (see FIGS. 7 and 9).

Bearing assembly 68 is designed to carry radial, thrust and bending moment loads simultaneously and incorporates roller bearings which are arranged cross wise by appropriate retainers to roll on right angle V grooves provided in the outside diameter surface of the inner bearing ring and the inner diameter surface of the outer ring. Such a bearing assembly is commercially available from T. H. K. Co. Ltd., Tokyo, Japan and is of the order described in U.S. Pat. No. 4,479,683, issued Oct. 30, 1984. As above noted the bearing support ring 66 is split with an outer annular portion 66a thereof intertied to remainder of ring 66 by cap or machine bolts 73 whereby to the tightly grip and hold the inner race of the bearing assembly 68 therebetween. The outer annular portion 66a of the support ring 66 is cast integrally with or otherwise fixed to the rotatable saddle 30 so that the latter along with the intervening structure 66 and ring gear 65 are moveable as a unit in response to driving activity of pinion 63; such rotatably moveable structure being supported by the single annular cross bearing 68.

Figure 9:
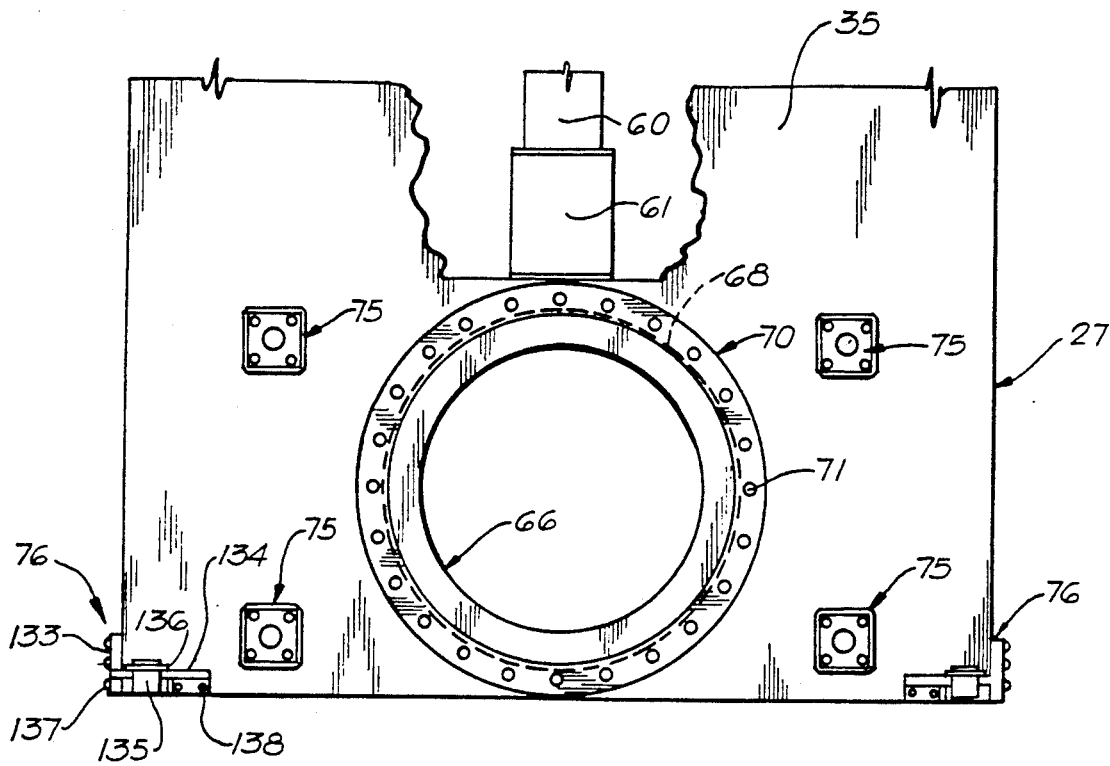
FIG. 9 is a front elevational view with portions broken away showing the Y-axis saddle associated with the assembly illustrated in FIG. 5, taken substantially from vantage line 9—9 of FIG. 7 and looking in the direction of the arrow thereon.

With specific reference to FIG. 9 of the drawings, it will be understood that the Y-axis saddle assembly 27 carries four brake assemblies 75, 75 which are disposed in generally rectangular array at equal radial distances from the center of central opening 72 in front wall 35. In addition to the brake assemblies 75, the saddle assembly 27 also includes two hard stop assemblies 76, 76 disposed at the lower corners of the saddle's front wall 35. Such stop assemblies cooperate with the rotatable saddle 30 for limiting the latter's rotational movement as will appear in greater detail presently.

Rotatable Saddle Assembly

With reference now to FIGS. 5-8 and 11 of the drawings, the features of the rotatable saddle will be set forth.

Figure 11:
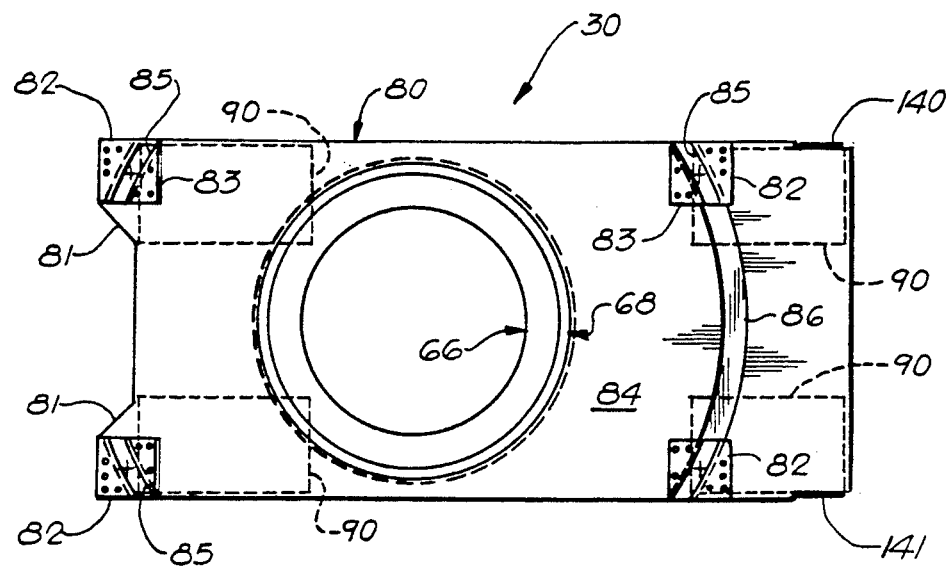
FIG. 11 is a rear elevation of a rotatable saddle which cooperates with the Y-axis saddle of the FIG. 9, viewed from vantage line 11—11 in FIG. 7 and looking in the direction of the arrow thereon.
Figure 13:
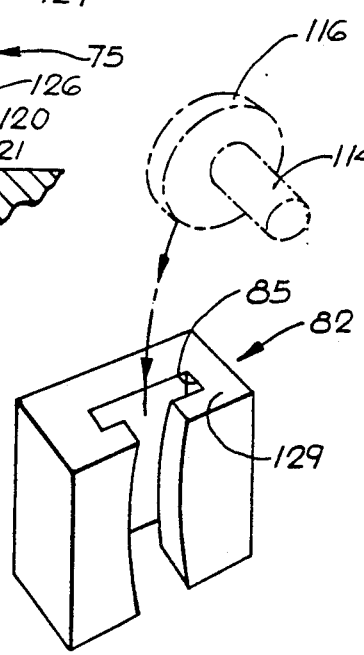
FIG. 13 is an enlarged perspective view of the brake shoe and brake pads associated with the brake assembly of FIG. 12.

Preferably the rotatable saddle comprises a unitary steel casting or, if desired, such may be a fabricated weldment of relatively heavy, rigid structure. In either event, saddle 30 comprises a rigid metal body 80 of generally rectangular formation, as best shown in FIG. 11, and includes a pair of projecting ear portions 81, 81 at one end which support keyed flange pads 82, 82. Such pads seat in recesses 83 formed inwardly of the rear face 84 of body 80 so that the keyed pads 82 lie flush with the face 84. In similar fashion two additional keyed pads 82, 82 are located in recesses 83 formed inwardly of the rear face of the saddle body 80 adjacent the right hand end as viewed in FIG. 11. Importantly the four pads 82 thus provided are located at equal radial distances from the center of bearing 68 which defines the A axis of rotation for saddle 30. Each of the keyed pads 82 is distinguished by a slotted opening of T-shaped cross section indicated at 85 (FIGS. 11 and 13); such recesses being formulated along an arc of uniform radial distance from the A axis of rotation. The T-slots 85 in the two right hand disposed keyed pads 82 as viewed in FIG. 11 are further interconnected by a continuing arcuate channel 86 extending across the back face of body 80 and formulated at the same radial distance from the A axis and same width as the T-slots 85, for purposes which will become more clear in description to follow. In brief, however, the T-slots in pads 82 cooperate with the brake assemblies 75.

While the illustration of the moveable saddle 30 as set out in FIG. 11 concerns the rear face thereof which confronts the Y-axis saddle 27 in operation, FIGS. 5-8 of the drawings, better illustrate features of the front side of assembly 30. As noted in FIG. 5 in particular, each of the front four corners of the saddle body 80 carries a rectangular slide pad 90 which is coupled one of a pair of parallel linear slide rails 91 fixed to the adjacent side of ram 13 to define a pair of parallel slide ways definitive of the Z-axis of movement for ram 13. The slide pads and rails 90, 91 correspond to the Y-axis pads and rails 55 and 56 heretofore described. As shown best in FIGS. 7, the pads 90 are fixed to body 80 of the saddle 30 by means of machine bolts 92 while the cooperating rails 91 are coupled to the ram 13 by bolts 93. More specifically as shown best in FIGS. 7 and 8, the slide pads 90 seat in shallow recesses 94 formed inwardly of the front face of the moveable saddle body and are held in such recesses by gibs 95 plus the bolts 92 as heretofore noted.

In addition to the four slide pads 90 described above, the front face of the moveable saddle 30 also includes a central lengthwise extending recessed channel 98 (see FIG. 5) which is receptive of a ball screw 99 that extends along one side of ram 13 and is rotatably supported near its opposite ends by bearing carrying bracket means 100. A drive motor 101 and toothed belt drive means 102 at the inner end of the ram 13 serve to rotatably drive screw 99 in response to selected energization of motor 101. The ball screw 99 is engaged by a ball nut 103 which is held by bracket means 104 fixed to the saddle body 80 by bolts 105. (see FIG. 5).

It will be understood that upon rotational driving of the screw 99 in response to selected rotational actuation of the motor and belt drive, ram 13 will translate relative to saddle 30 in an appropriate direction, depending on the rotational direction of the screw 99. This serves to axially extend or retract the ram along its Z axis as required.

Brake System

With reference to FIG. 9 of the drawings, it will be recalled that the Y-axis saddle assembly 27 includes four brake assemblies 75 which cooperate with the keyed pads 82 of the rotatably moveable saddle 30. The brake assemblies operate to positively hold the saddle 30 in selected positions, particularly the horizontal operating positions for ram 13. To better understand this relationship and the working of the brake means, specific reference is now made to FIGS. 11, 12 and 13 of the drawings.

Figure 12:
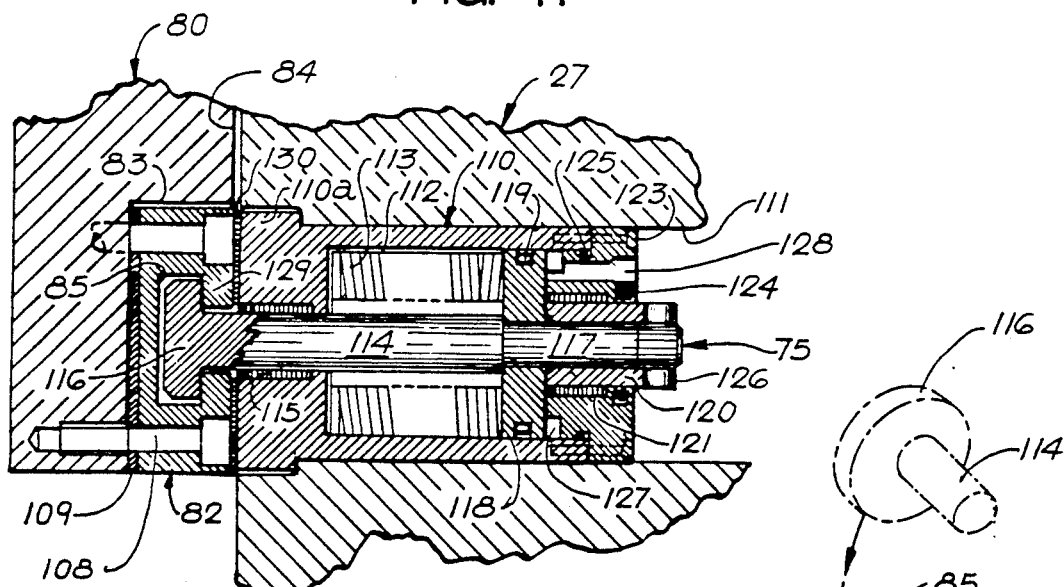
FIG. 12 is an enlarged cross sectional view taken substantially along vantage line 12—12 of FIG. 6 and looking in the direction of the arrows thereon to illustrate features of the positive acting brake system associated with the saddle of FIG. 11.

As previously mentioned, the four keyed pads 82 are secured in their appropriate sockets 83 in the rear face of the moveable saddle body 80 as illustrated in FIG. 11 and more particularly in FIG. 12. Each pad 82 is secured in place by a plurality of bolts 108 and aligned registeringly with one of the brake assemblies 75 associated with the Y-axis saddle in a horizontal position of ram 13. Also it will be noted from FIG. 12 that each of the pads 82 is positioned in its respective socket 83 over a spacer 109 whereby the outer face of the pad is aligned flush with the rear face 84 of the saddle body 80, as shown.

Each brake assembly 75 as best shown in FIG. 12, comprises a generally cylindrical piston housing 110 which fits snuggly into a appropriate cylindrical opening 111 in the Y-axis saddle 27. Piston housing 110 includes an interior cylindrical chamber 112 receptive of a cup spring assembly 113. A piston rod 114 extends the full length of the piston housing 110 and coaxially through the spring assembly 113. Rod 114 is supported adjacent its outer end by bearing means 115 located in a square flanged end portion 110a of the piston housing and fixed to the latter by bolts (not shown). An enlarged cylindrical head portion 116 is formed at the outer end of shaft 114 to fit into the slotted openings 85 of adjacently opposed keyed pads 82 (see FIG. 13).

The inner end of rod 114 is formed with a reduced diameter portion 117 that extends through a cylindrical piston 118 which is pressed onto rod portion 117 to engage one end of the spring assembly 113 in chamber 112 and abut the shoulder formed by the junction or rod 114 and its smaller diametered portion 117. The cylindrical piston 118 fits snuggly against the walls of chamber 112 and carries an O-ring seal 119 or the like to effectuate sealed engagement with the walls thereof. Axially beyond the piston 118, rod portion 117 is surrounded by a cylindrical bushing 120 carried within a cylindrical bearing 121 disposed coaxially within the body of an end cap 122 that is bolted to the inner end of housing 110 by bolts 123. Another O-ring seal 124 provides sealed engagement between the end cap 122 and bushing 120 while a third O-ring seal 125 provides sealed engagement between the end cap 122 and the interior walls of the body chamber 112.

A lock nut 125 secures the bushing 120 and piston 118 to piston rod 114 to effect conjoint movement of such parts axially of chamber 112 in response to the application of suitable pressurized hydraulic fluid or the like to the back side of piston 118.

To this latter end an annular chamber 127 formed between the end cap 122 and piston 118 communicates with fluid inlet 128. With this arrangement, application of pressurized fluid to chamber 127 serves to advance piston 118 against the spring assembly 113 to move the head portion 116 of the piston rod axially away from flange portion 129 of the keyed pad 82 to release the latter. Conversely relief of the hydraulic pressure within the chamber 127 permits the spring means 113 to pull the head portion 116 against the flange portion 129 of the keyed pad which forces the pad tightly against an annular shim 130 disposed between the keyed pad 82 and the flange portion 110a of the piston housing 110. It will be recognized that when this occurs the keyed pad is pulled tightly against shim 130 by spring 113 to lock the rotatable saddle against rotational movement. On the other hand, upon the application of appropriate hydraulic pressure against the piston 118, the pressure applied by spring assembly 113 is relieved and the head end 116 of the piston rod 114 releases the pad to permit rotational movement of the saddle 30. In this latter respect it will be noted that the brake assemblies 75 are actuated to simultaneously positively release or lock the rotatable saddle.

Figure 10:
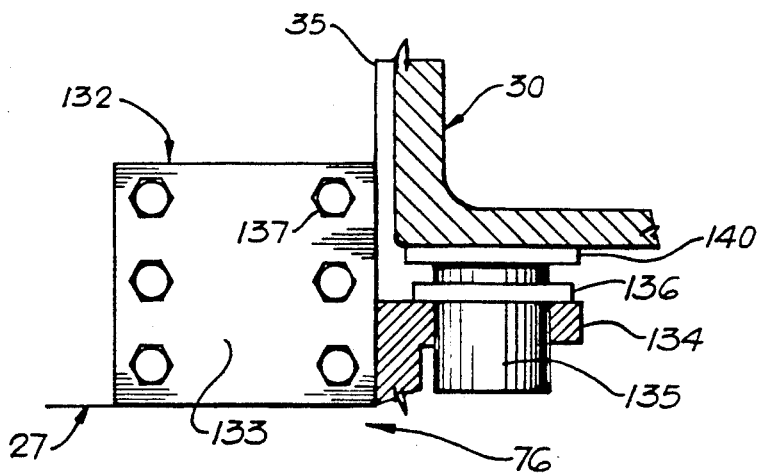
FIG. 10 is an enlarged end elevation of one of two hard stop assemblies associated with the saddle illustrated in FIG. 9.

With reference now to FIGS. 9 and 10 of the drawings, the features of the stop assemblies 76 will be set forth.

It will be recalled that saddle 30 is adapted to be rotated about its A axis for the purpose of reversely positioning ram 13, so that the latter may service work assemblies in adjacent aisles of a work cell. To that end the rotatable support system previously described permits selected rotational movement of saddle 30 and the brake systems 75 and pads 82 serve to lock saddle 30 in each of two selected horizontal ram operating positions. In order for the operator to be assured that ram 13 is in proper horizontal operating position before setting the brake assemblies after an elected rotational movement of saddle 30, positive hard stop systems 76 are provided.

As shown in FIG. 9, the Y-axis saddle 27 is equipped with two such stop systems, one at each of its lower corners to define the desired two horizontal ram operating position. Each stop system, as shown in FIG. 10, comprises a bracket 132 having a mounting plate 133 formed integrally with a right angularly related mounting arm 134, the latter of which supports a vertically adjustable stop 135 and adjusting collar 136.

Plate 133 and extending arm 134 are fixed to the side and front walls of the Y-axis saddle by bolts 137 and 138 respectively, so that stop 135 is located outwardly of the outside of wall 35 to confront the rotatable saddle 30.

To cooperate with the stop pads 135, the rotatable saddle 30 (see FIG. 11) has two hard stop discs 140, and 141 fixed to its top and bottom right hand corners, respectively. Each of these disc is aligned to contact one of the stops 135, at the desired limits of rotational movement for saddle 30. Thus the top corner mounted hard stop disc 140 on saddle 30 as viewed in FIG. 11, will rest against the stop 135 located at the bottom right hand corner of the Y-axis saddle 27 as seen in FIG. 9 in one operating position for ram 13. On the other hand the bottom disc 141 will engage the left hand stop pad 135 of FIG. 9 in the other or opposite horizontal operating position for ram 13 (see FIG. 5 for the frontal assembled relation of saddles 27 and 30).

With this arrangement limiting rotation of saddle 30 to insure accurate horizontal positioning of ram 13 is carried out.

From the foregoing it is believed those familiar with the art will readily recognize the novel advancement of this invention and will understood that while this invention has been described in relation to a preferred embodiment thereof, such is susceptible to variations, modifications and substitutions of equivalents without departing from the spirit and scope of this invention which is intended to be unlimited by the foregoing except as may appear in the following appended claims.

The embodiments of the invention in which an exclusive property or privilege is claimed are defined as follows:

1. In a mobile, remotely controlled, automatic machining center or industrial robot for positioning tools relative to fixture held work pieces, the combination comprising:
   a base mounted for movement along a horizontal X-axis;
   a single vertical column supported on said base and definitive of a vertical Y-axis;
   an elongated ram slidably supported on said column for linear movements both along and transversely of said column's vertical Y-axis, and
   means rotatably mounting said ram on said column for substantially 180° rotation in a vertical plane about a horizontal A-axis.

2. The combination of claim 1, wherein said A-axis is intersectingly normal to said Y-axis and parallel to said X-axis, and said ram is mounted for said linear movements adjacent one vertical side of said column.

3. The combination of claim 1, wherein said means rotatably mounting said ram comprises a Y-axis saddle mounted on said column for linear movement parallel to said Y-axis, and a rotatable saddle coupled to said Y-axis saddle for linear movements therewith and for rotation relative thereto about said A-axis.

4. The combination of claim 3, and powered actuating means for rotatably driving said rotatable saddle about said A-axis.

5. The combination of claim 3, and power actuated brake means for selectively locking said rotatable saddle at either of two diametrically opposite selected positions of rotation.

6. The combination of claim 3, and means slidably interjoining said ram and said rotatable saddle whereby to afford movement of said ram relative to said rotatable saddle and Y-axis along a linear Z-axis.

7. The combination of claim 5, wherein said selected positions are determinative of two horizontal operating positions for said ram.

8. The combination of claim 7, and stop means on said Y-axis saddle, engageable by said rotatable saddle for preventing movement of the latter beyond said two operating positions.

9. The combination of claim 6, and power actuated means for moving said ram along said Z-axis.

10. The combination of claim 9, wherein said power actuated means comprises a rotatable ball screw supported on said ram, and a ball nut fixed to said rotatable saddle and threadingly engaged with said screw.

11. The combination of claim 4, wherein said actuating means comprises a motor driven pinion gear, a large ring gear drivingly engaged with and driven by said pinion gear, ring means connecting said ring gear with said rotatable saddle, and single bearing means coupled to said Y-axis saddle and said ring means for rotatably supporting the latter and said ring gear.

12. The combination of claim 11, and means within the interior of said Y-axis saddle for supporting said for actuating means, pinion gear, ring gear, ring means and bearing means.

13. The combination of claim 1, wherein said ram is adapted to carry work engaging tools at one outer end thereof, and means for rotatably moving said ram to and between horizontal position limits whereby tools carried at said outer end thereof may be positioned on opposite sides of said column, and means for locking said ram in each of said horizontal position limits.

14. A mobile remotely controlled, automatic machining center or industrial robot for spatially moving and positioning tools relative to fixture held work pieces, comprising:
   a base mounted for movement along a horizontal axis;
   a rigid vertical column undersupported by said base and definitive of a vertical Y-axis;

a Y-axis saddle slidably connected to said column for linear Y-axis movements;

a rotatable saddle rotatably mounted on said Y-axis saddle for rotation about a horizontal A-axis parallel to said X-axis; and an elongated ram for operably carrying work engaging tools at one end thereof slidably mounted on said rotatable saddle for movement along a linear Z-axis;

said ram being horizontally moveable transversely of said column's Y-axis, and rotatable about said A-axis between diametrically opposed horizontal operating positions thereby to locate said tools in working relation with work pieces located on opposite sides of said column.

* * * * *